(12) United States Patent
Hosein

(10) Patent No.: US 6,363,052 B1
(45) Date of Patent: Mar. 26, 2002

(54) CONGESTION CONTROL IN NETWORK SYSTEMS

(75) Inventor: Patrick A. Hosein, Holmdel, NJ (US)

(73) Assignee: AT&T Corp, New York, NY (US)

(*) Notice: Subject to any disclaimer, the term of this patent is extended or adjusted under 35 U.S.C. 154(b) by 0 days.

(21) Appl. No.: 09/119,146

(22) Filed: Jul. 20, 1998

(51) Int. Cl.[7] .............................................. G01R 31/08
(52) U.S. Cl. ........................... 370/230; 370/244; 379/8
(58) Field of Search ................................ 370/229, 230, 370/235, 241, 242, 244, 248, 252, 232–5, 236, 237; 709/223, 224, 225; 379/1.01, 8, 9, 16, 111, 112.03, 112.06

(56) References Cited

U.S. PATENT DOCUMENTS 5,068,892 A * 11/1991 Livanos ....................... 379/221
6,047,118 A * 4/2000 Sofman et al. ........ 395/500.34

OTHER PUBLICATIONS

S. Fuhrmann et al., "An Adaptive Autonomous Network Congestion Controller," IEEE Proc. of 35th Conf. on Decision and Control, Kobe, Japan, Dec. 1996, vol. 1, 1996, pp. 301–306.

B. Wallstrom and C. Nyberg, "Transient Model of Overload Control and Priority Service in SPC–system," Teletraffic and Datatraffic in a Period of Change, ITC–13, A. Jensen and V. B. Iversen (Eds.), Elsevier Science Publishers B.V. (North--Holland), 1991; pp. 429–434.

S. Thierry et al., "Overload Control In A Distributed System," Teletraffic and Datatraffic in a Period of Change, ITC–13, A. Jensen and V. B. Iversen (Eds.), Elsevier Science Publishers B.V (North–Holland), pp. 421–427.

"Digital Exchanged: Digital Exchange Design Objectives—Operations and Maintenance," ITU–T Recommendation Q.543, International Telecommunication Union, Mar. 1993.

D. J. Houck et al., "Failure and Congestion Propagation Through Signaling Control," Proc. of the 14th International Teletraffic Congress, Antibes, France, Jun. 1994, J. Labetoulle and J. W. Roberts (Eds.), pp. 367–376.

J. E. Burns and D. Ghosal, "Automatic Detection and Control of Media Stimulated Focused Overloads," ITC 15, V. Ramaswami and P. E. Wirth (Eds.), Elsevier Science B.V., 1997, pp. 889–900.

M. Kihl and M. Rumsewicz, "Analysis of overload control strategies in combined SSP–SCPs in the Intelligent Network," ITC 15, V. Ramaswami and P. E. Wirth (Eds.), Elsevier Science B.V., 1997, pp. 1209–1218.

P. Hosein, "An Improved Automatic Congestion Control Algorithm for Telecommunication Networks," submitted to Telecommunication Systems, 1998.

S. Fuhrmann et al., "An Adaptive Autonomous Network Congestion Controller," ITC Specialist Seminar on Control in Communications, 1996, pp. 337–346.

* cited by examiner

Primary Examiner—David R. Vincent

(57) ABSTRACT

Congestion control method in which a source switch measures a number of calls sent by the source switch to a congested switch that are rejected by the congested switch. In response to a report from the congested switch identifying its level of congestion, the source switch blocks calls destined for the congested switch based upon the measured number of rejected calls. A given switch may act as both a congested switch and a source switch. The switch routes call traffic to one or more switches in a network; the switch is a source to those other switches. At the same time, the same switch may receive call traffic from the other switches. The switch may be a congested switch and the other switches may be source switches.

20 Claims, 2 Drawing Sheets

CONGESTION CONTROL IN NETWORK SYSTEMS

BACKGROUND OF THE INVENTION

The present invention relates to a congestion control technique for use in network systems.

FIG. 1 is a block diagram representing a modern communications network 100. The network 100 is populated by a number of communication switches 110–170. Switches 110–170 are interconnected by communication trunks according to a predetermined arrangement. To establish a communication link between, for example, two telephones 10, 20 the communication network 100 establishes a call path therebetween. One such call path is illustrated in FIG. 1, traversing switches 120, 140, 160 and 170.

As is known, at the beginning of a call, the call path is established incrementally through the network 100. For example, an originating telephone 10 generates an off-hook signal and enters a telephone number of a destination telephone 20. Switch 120 interprets the telephone number and determines to route the call in the direction of switch 140. Switch 120 signals switch 140 with a call request message identifying telephone 20 as the destination of the call path. In response, if switch 140 possesses available capacity sufficient to route the call, switch 140 may reply within an acknowledgment message to switch 120. If not, switch 140 signals switch 120 with a call reject message.

If switch 140 determines that it can process the call, it determines that it will route the call through switch 160. Switch 140 repeats the process that was used by switch 120. It generates a call request message to switch 160 which may be responded to by either an acknowledgment message or a call reject message. Thus, a call path is established incrementally through network 100 to establish a communication link between two telephones. Initiation of call paths in communication networks is well-known.

In a signaling network, the known "Automatic Congestion Control" algorithm (ACC) is used during switch overloads to maintain network throughput. Studies demonstrate that the known ACC algorithm performs poorly. Indeed, these studies suggest that switch throughput can be improved by disabling the ACC algorithm entirely.

The following is taken from the ITU Standards (Blue Book):

"Automatic Congestion Control (ACC) is used when an exchange [switch] is in an overload condition. Two levels of congestion are distinguished, a less severe congestion threshold (congestion level 1) and a more severe congestion threshold (congestion level 2). If either of the two congestion levels is reached, an automatic congestion control information message may be sent to the adjacent exchanges indicating the level of congestion (congestion level 1 or 2). The adjacent exchanges, when receiving an automatic congestion control information message, should reduce their traffic to the overload affected exchange."

See, CCITT-Blue Book, *Specification of Signaling System Number 7* (1998).

The ACC level is typically based on the real time utilization and queue length thresholds in a "Congested Switch-." The ACC levels are passed back to a source switch in the known Release (REL) and Address Complete (ACM) messages. When a source switch determines that a congested switch is in overload, it blocks calls directed to the congested switch. If the congested switch's ACC level is 1, then the source switch blocks 75% of Hard-to-Reach (HTR) calls destined for the congested switch. If the ACC level is 2, then the source switch blocks all HTR calls and 75% of Not-Hard-to-Reach (NHR) calls destined for the congested switch. Call blocking remains in effect for a period of 3 seconds. Additional details of the ACC algorithm may be found in ITU-T Recommendation Q.542, *Digital Exchange Design Objections—Operations and Maintenance*.

Studies demonstrate that the known ACC algorithm performs poorly. See, Houck, et al., *Failure and Congestion Propagation Through Signaling Control*, Proc. 14th Int'l Teletraffic Congress (June 1994). Houck draws the following conclusions:

The present implementation of the ACC algorithm is non-optimal and higher throughput can be achieved by turning it off;

The ACC algorithm over-controls traffic which, in turn, leads to congestion propagation from congested switches to non-overloaded switches; and The control duration (3 seconds) is too long and the control granularity (two blocking levels for HTR and NHR) is too coarse.

Houck recommends increasing the granularity of the control (from two values) and decreasing the control duration interval (from 3 seconds). However, a change in the number of levels would require message format changes in the ACC standard. Accordingly, Houck's recommendation requires agreement from all major switch venders.

A network congestion controller was suggested by Furmann, et al. See, "An Adaptive Antonomous Network Congestion Controller," Proc. ITC Specialists Seminar on Control in Comm. (1996). Furmann's approach uses congestion control at a source switch based on locally available information rather than from commands originated from a congested switch. Its controller attempts to maintain a call acceptance rate at a predetermined value.

There is a need in the art for a congestion control technique in a communication system that maintains high network throughput and that prevents switches from experiencing severe congestion events while, at the same time, working within the framework of the present ACC signaling standard.

SUMMARY OF THE INVENTION

Embodiments of the present invention provide a congestion control method in which a source switch measures the number of calls sent by the source switch to a congested switch that are rejected by the congested switch. In response to a report from the congested switch identifying its level of congestion, the source switch blocks calls destined for the congested switch based upon the measured number of rejected calls, the number of calls it may have previously blocked and the value of the ACC level it most recently received from the congested switch.

A given switch may act as both a congested switch and a source switch. The switch routes call traffic to one or more switches in a network; the switch is a source to those other switches. At the same time, the same switch may receive call traffic from the other switches. The switch may be a congested switch and the other switches may be source switches.

DETAILED DESCRIPTION

The present invention alleviates the disadvantages of the prior art by substituting an improved congestion control method for the known ACC algorithm in a communication network. The congestion control method blocks calls at a source switch based upon the level of congestion reported by a congested switch, the measured number of calls previously rejected by the congested switch and the number of calls it may have previously blocked. The present invention builds upon the following premise:

Goodput at a congested switch can be maximized by providing it with an offered load which is large enough so that the switch never becomes idle (no over-controlling) but small enough so that delays do not build to a point where the switch wastes resources on timed-out messages (i.e., messages that have spent too much time in the network and must be discarded).

This occurs by having source switches reduce an amount of calls directed to the congested switch so that the total load offered to the congested switch matches a target load. In practice, it may be best to maintain the congested switch in a lightly overloaded condition to ensure that the switch does not become idle. Therefore, in an alternative, source switches dynamically adjust the offered load to the congested switch to maintain it in a lightly overloaded condition.

Figure 1:
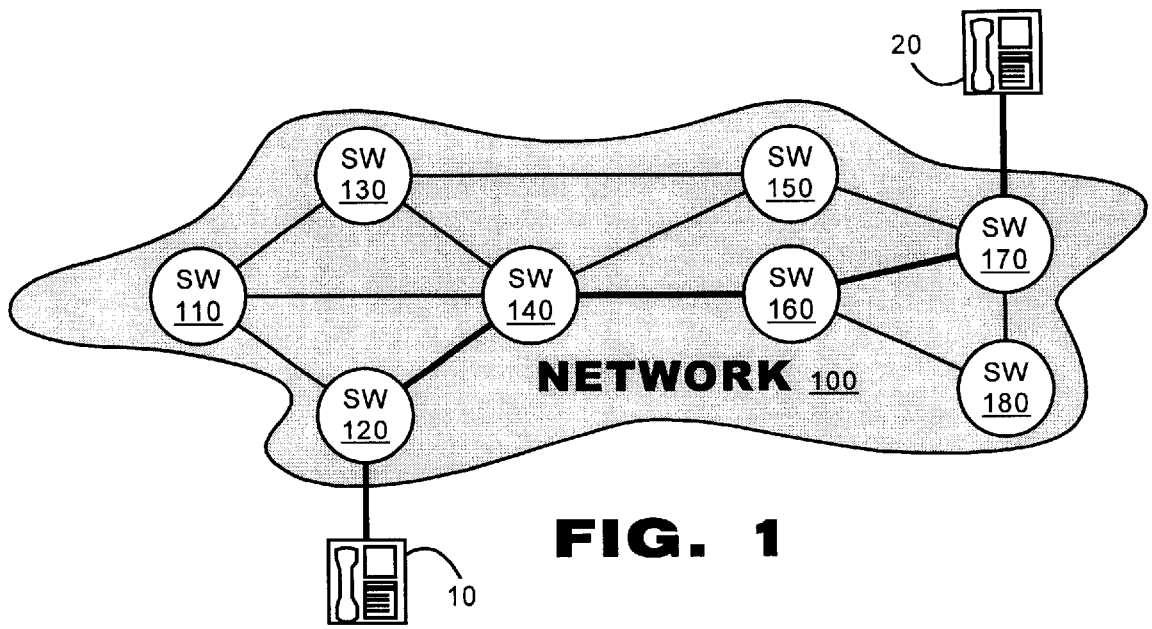
FIG. 1 illustrates an exemplary communication network having application with the present invention.
Figure 2:
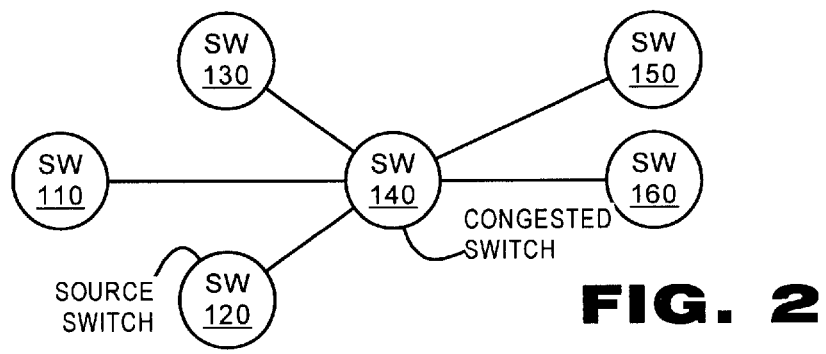
FIG. 2 illustrates select switches of the network of FIG. 1

FIG. 2 illustrates the switches 110–160 of FIG. 1. Consider, as an example, a situation where switch 140 is a congested switch. Switches 110–130 and 150–160 are source switches to congested switch 140. Congestion control is described in connection with control of congested switch 140 and of a source switch 120. However, congestion control performed by switch 120 may be performed also by switches 110, 130 and 150–160.

As is known, switches have internal overload control mechanisms for protection. During an overload condition, the control mechanisms use internal metrics to determine which calls should be rejected. It suffices for the present discussion to assume that a single aggregate queue is maintained for all messages and that this queue feeds one or more message processors. Internal control uses a simple queue threshold to decide which calls to reject. This is but one potential configuration of a communication switch. The present invention also finds application with a switch having multiple queues.

A switch 140 generates an "ACC value" that reflects the level of congestion at the switch 140. Again, a simple queue threshold mechanism determines which ACC value (0, 1 or 2) is inserted into REL and/or ACM messages. In practice, a less bursty call reject mechanism (such as a rate-based control) may result in better performance.

ACC values are determined at the congested switch 140 on a periodic basis (such as every 250 ms) and passed back to source switches 110–130 and 150–160 in REL and ACM messages.

In an embodiment, a congested switch 140 may execute the following pseudocode to respond to call requests (using Initial Address Messages ("IAM")) and generate ACC values:

---

Pseudocode for the Internal and ACC Controls at a Switch

---

Let
q = queue length
$q_t$ = queue target value (such as 250)
INTERNAL CONTROL

On receipt of a IAM do {
    if (q > 2$q_t$) {reject IAM}
    else if (q < $q_t$) {accept IAM}
    else reject IAM with probability (q–$q_t$)/$q_t$
}
ACC CONTROL Every control interval (such as 250 ms) do {
    if (q > 1.1 $q_t$) {ACC = 2}
    else if (q < ¼ $q_t$) {ACC = 0}
    else {ACC = 1}
}

---

Figure 3:
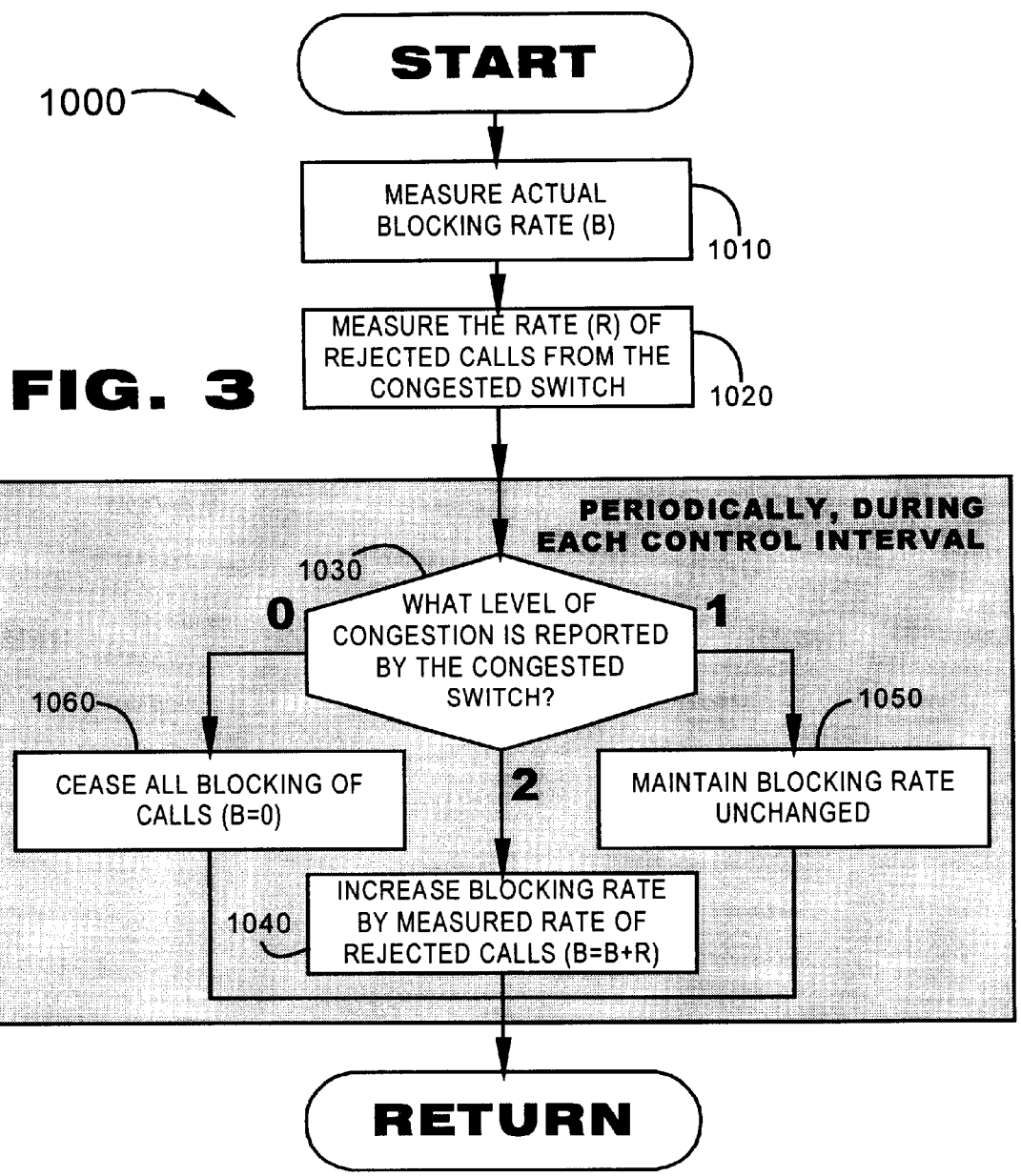
FIG. 3 illustrates a method of operation of a source switch according to the present invention.

FIG. 3 illustrates a method of operation 1000 of source switch 120 in accordance with an embodiment of the present invention. The source switch 120 may block calls destined for the congested switch 140 at some rate B (Step 1010). In a first iteration, B is set to zero. However, for subsequent iterations, B may become non-zero based upon congestion control applied in earlier iterations. The source switch 120 also measures a rate R at which the congested switch 140 rejects calls requested by source switch 120 (Step 1020).

Periodically, at the beginning of each control interval, the source switch 120 updates the rate B at which it will block calls directed to the congested switch 140. It tests the level of congestion (i.e., the ACC value) reported most recently from the congested switch 140 (Step 1030). If the congested switch 140 reports severe congestion (ACC=2), the source switch 120 increases B, the rate at which it blocks calls (Step 1040). For example, it may increase B by R (B=B+R), the measured rate of the call rejections, or in proportion to R (B=B+kR, for some k).

If the congested switch 140 reports light congestion (ACC=1), the source switch 120 may maintain B unchanged for the current control interval (Step 1050). If the congested switch 140 reports no congestion (ACC=0), the source switch 120 may set B to zero (Step 1060). It ceases to block calls to the congested switch 140.

The method 1000 of FIG. 3 may be repeated for each control interval. Optionally, the method also may be called each time a source switch receives a REL for rejected IAMs. In an embodiment, a source switch may execute the following pseudocode to implement the method 1000 of FIG. 3:

---

Pseudocode for the Control at the Source Switches

---

Let
b = number of calls that the source switch blocked in the previous interval;
r = number of calls from the source switch rejected in the previous interval; and
ACC = ACC value received most recently from the congested switch.

-continued

Pseudocode for the Control at the Source Switches

```
Every control interval (such as 1 sec) do {
        if (ACC = 2) {block min(b + r, all received) IAMs}
        else if (ACC = 1) {block min(b, all received) IAMs}
        else {do not block any IAMs}
}
```

In practice, although source switches 110–130, 150–160 each may operate according to the method of FIG. 3, they may not block calls to a congested switch 140 at the same rate. That is, B for source switch 120 may be different from B for source switch 130. Each source switch 110–130, 150–160 observes call rejections only for call requests that it forwards to the congested switch 140. So, for example, if congested switch 140 rejects a call request from source switch 120, only switch 120 observes the rejection. The rate of rejection observed by each of source switches 110–130, 150–160 depends upon the rate at which each source switch 110–130, 150–160 directs calls to the congested switch 140. Thus, although the source switches 110–130, 150–160 may operate according to the same congestion control method, in practice each may block calls to the same congested switch 140 at different rates than others. Typically sources with higher call rates (to the congested switch 140) will have higher blocking rates. This ensures fairness.

The control method 1000 possesses several advantages over Furmann's controller. First, a source switch 120 uses ACC values to determine when a congested switch 140 is in overload. The congested switch 140 can more readily detect overload conditions than can a source switch 120. Also, the source switch 120 uses the ACC value in computing a rate at which it offers calls to the congested switch 140. Because the ACC value indirectly provides global information to the source switch 120, greater precision is obtained.

Also, instead of monitoring and maintaining a call acceptance rate at a predetermined value, the present invention monitors and maintains the call blocking rate at a predetermined value. Assume that the total load on all source switches 110–130, 150–160 varies slowly from one control interval to another. If a source switch 120 were to maintain a specific call acceptance rate, the source switch 120 may not be able to maintain a call acceptance rate constant because traffic fluctuates. With time, the total load offered to the congested switch 140 will drop, eventually resulting in overcontrol. Suppose instead that the source switch 120 tries to maintain the blocking rate at a predetermined value. Again, because of fluctuations in traffic, a particular source switch 120 may not be able to block as many calls as it did in the previous interval. With time, the total load offered to the congested switch 140 increases. This is desirable because it maintains the congested switch 140 in a lightly overloaded condition.

At the source switches 110–130, 150–160, instead of simply using the ACC values to block a fixed percentage of IAMs, the call blocking rate is based upon the performance of the congested switch 140. Each time a source switch 120 receives a REL message from the congested switch 140, the source switch 120 updates the ACC value to the current value.

As the congested switch 140 becomes heavily congested (ACC=2), the source switch 120 increases its blocking rate based on the rejections received from the congested switch 140. This continues until the rejection rate at the congested switch 140 drops to a point where ACC=1. In the ACC=1 range, the source switch maintains the blocking rate constant. However, over time, the load offered to the congested switch 140 increases because the blocking rate decreases with time due to traffic fluctuations. This causes the congested switch 140 once again to enter the ACC=2 range. The congested switch 140 oscillates between the ACC=1 and ACC=2 ranges, maintaining the congested switch 140 in light overload.

A source switch 120 reacts much faster when the congested switch 140 enters the ACC=2 range because the congested switch 140 sends RELs for rejected IAMs back to the source switch 120 immediately. In the ACC=1 and ACC=0 regions, because IAMs are not rejected, the source switch 120 receives ACC values in the ACMs and RELs for accepted calls.

Figure 4:
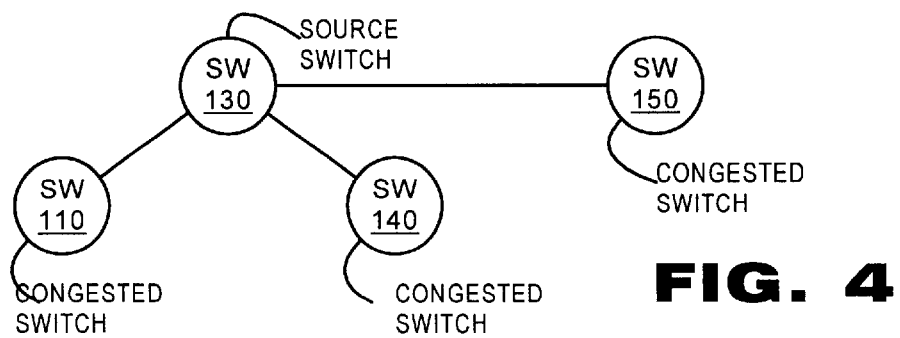
FIG. 4 illustrates select switches of the network of FIG. 1

Not only does one congested switch 140 receive calls from many source switches, but a single source switch may be a source to many congested switches. FIG. 4 illustrates source switch 130 coupled to congested switches 110 and 140–150. Source switch 130 may employ the method 1000 of FIG. 3 individually for each congested switch 110, 140–150 to which it is connected. For each congested switch 110, 140–150, the source switch 130 maintains a an separate measurement of rejected call rate R and of blocked call rate B.

Table 1 summarizes, for one embodiment of the present invention, control of blocking in a source switch 120 based on ACC levels reported by a congested switch 140.

TABLE 1

Summary of the Control Actions at
the Source Switch and Congested Switch

| Queue Length | Congested Switch Internal Control | ACC Value | Source Switch Control |
|---|---|---|---|
| $2 q_t < q$ | reject all new calls, stop non-essential work | ACC = 2 | block min(b + r, all received) calls |
| $1.1 q_t < q \leq 2 q_t$ | call reject prob = $(q - q_t)/q_t$ stop non-essential work | ACC = 2 | block min(b + r, all received) calls |
| $q_t < q \leq 1.1 q_t$ | call reject prob = $(q - q_t)/q_t$ | ACC = 1 | block min(b, all received) calls |
| $0.25 q_t < q < q_t$ | call reject prob = 0 do non-essential work. | ACC = 1 | block (min b, all received) calls |
| $0 < q < 0.25 q_t$ | call reject prob = 0 do non-essential work | ACC = 0 | block 0 calls |

The present invention has been described as responsive only to REL messages. However, the invention finds application with other messages exchanged between congested switches and source switches that identify ACC levels of the congested switch. For example, ACM messages may be used.

As will be appreciated, the congestion control method 1000 of the present invention may be integrated into a SS7 communication network without requiring any global change in operation of the network 100. The method 1000 does not disturb the ACC reporting protocol of SS7 networks. Indeed, no change at all would be required at a congested switch 140. Also, the present invention may be integrated gradually in existing communication networks. There is no requirement that every switch 110–120 in the network 100 employ the congestion control method of the present invention. Certain switches may employ the ACC algorithm of SS7, other switches may disable it and still other switches may use the congestion control method of the present invention. However, it is anticipated that, as the advantages of the present invention are realized, all switches of a communication network eventually will use the method of the present invention.

As discussed, the present invention provides a congestion control technique that improves throughput, is fast and advantageously maintains a congested switch in a lightly overloaded condition.

I claim:

1. A congestion control method in a communication network comprising:

measuring a rate of rejected calls from a congested switch during a control interval, receiving a message from the congested switch representing a level of congestion during the control interval, and responsive to the level of congestion and for a succeeding control interval of less than three seconds, increasing a blocking rate of calls destined for the congested switch.

2. The method of claim 1, wherein, when the message indicates that the switch is in a level of heavy congestion, the blocking rate is increased by a rate proportional to the rate of rejected calls.

3. The method of claim 1, wherein, when the message indicates that the switch is in a level of light congestion, maintaining the blocking rate constant.

4. The method of claim 1, wherein, when the message indicates that the switch is in a level of no congestion, setting the blocking rate to zero.

5. The method of claim 1, wherein the method is performed at a source switch in communication with the congested switch.

6. The method of claim 1, further comprising periodically repeating the method.

7. The method of claim 1, wherein the message is a call release message.

8. The method of claim 1, wherein the message is an address complete message.

9. A method of controlling congestion in a communication network, comprising:

blocking calls addressed to a network switch at a blocking rate, measuring a rate of calls rejected by the switch during a control interval, receiving a message from the switch representing a level of congestion at the switch during said control interval, and when the message indicates heavy congestion and for a succeeding control interval of less than three seconds, increasing the blocking rate by an amount based upon the measured rate of rejected calls.

10. The method of claim 9, wherein the blocking rate is increased by an amount equal to the rate of rejected calls.

11. The method of claim 9, further comprising when the congestion level indicates that the switch experience moderate congestion, maintaining the blocking rate constant.

12. The method of claim 9, further comprising, when the congestion level indicates that the switch experiences light congestion, setting the blocking rate to zero.

13. The method of claim 9, further comprising periodically repeating the method.

14. The method of claim 9, wherein the message is a call release message.

15. The method of claim 9, wherein the message is an address complete message.

16. The method of claim 9, wherein the method is performed at a source switch in communication with the congested switch.

17. A method of processing a call request signal comprising:

receiving a call request signal, identifying switch to receive the call request signal, determining from a blocking rate whether the call request should be blocked, if the call request should not be blocked, routing the call request to the switch, receiving a congestion indicator signal from the switch representative of a level of congestion at the switch during a control interval, and responsive to the congestion indicator signal and for a succeeding control interval of less than three seconds, increasing the blocking rate based on a previously measured rate of rejected calls from the switch.

18. The method of claim 17, further comprising, before the receiving step, measuring the rate of the rejected calls from the switch.

19. The method of claim 17, wherein the method is performed at a second switch in communication with the first switch.

20. The method of claim 19, wherein the second switch performs the method with respect to a plurality of switches and maintains blocking rates and measures rates of rejected calls independently for each.

* * * * *